July 1, 1952  M. MICHELET  2,602,155
WELDING SYSTEM
Filed Dec. 3, 1949  2 SHEETS—SHEET 2
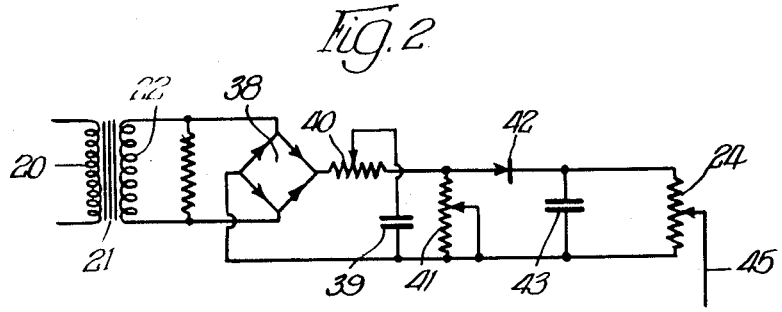
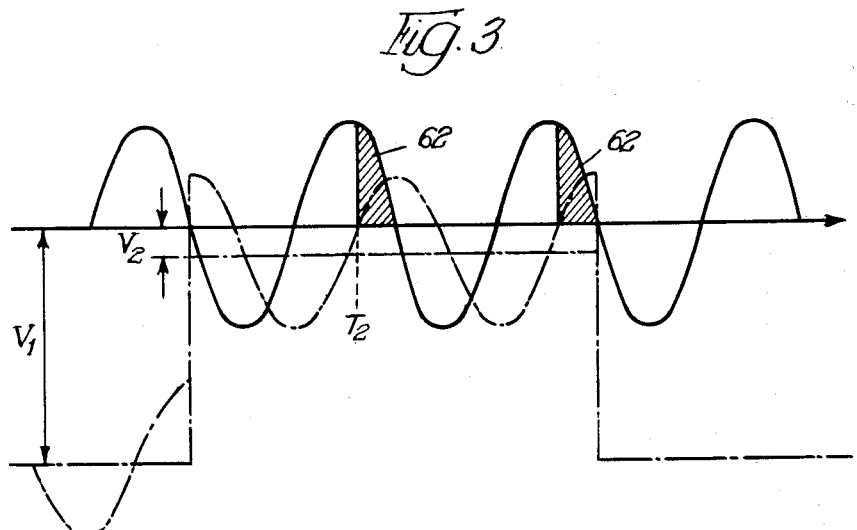
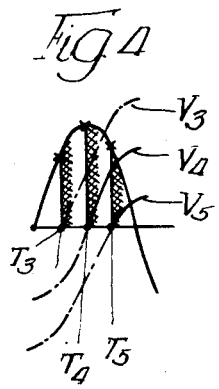
INVENTOR.
Marcel Michelet,
BY Patented July 1, 1952

2,602,155

UNITED STATES PATENT OFFICE 2,602,155

WELDING SYSTEM

Marcel Michelet, Paris, France, assignor to Welding Research, Inc., Chicago, Ill., a corporation of Illinois Application December 3, 1949, Serial No. 130,978
In France April 13, 1949

8 Claims. (Cl. 323—32)

The invention relates to a welding system and has reference more particularly to a welding system incorporating an improved phase shift control for maintaining the welding current substantially constant for any particular setting by automatically shifting the firing point of the electric discharge valves that conduct primary current to the welding transformer.

It is old and of common knowledge to provide welding systems having phase shift control wherein a particular value of welding current is obtained by shifting the firing point of the ignitrons which in turn control the flow of the primary current to the welding transformer. Welding systems in the past have also been provided with a phase shift network for controlling the welding current by automatically adjusting the firing point of the ignitrons in such a manner that it is a function of the welding current immediately preceding. This is done in order to maintain the welding current at a constant value during the welding operation.

Many disadvantages are inherent in these prior art systems and mention may be made of the following:

When a welder operates with very short timing, it is difficult to use an automatic regulator which will maintain the welding current at a predetermined value.

The time constant of the system is either very long, and the same does not respond fast enough, or it is very short, and there is a possibility of oscillation in the circuit.

It is an object of the present invention to obviate the above disadvantages.

A more specific object of the invention is to provide an improved phase shift circuit which will control the firing of electric discharge valves by applying a variable grid potential to the firing tubes controlling said discharge valves and which is obtained by superimposing an alternating current voltage on an adjustable direct current voltage.

Another object of the invention is to provide a welding system incorporating an improved phase shift circuit, the operation of which is a function of the line voltage variations and of the welding circuit impedance variations, whereby the welding current is automatically maintained at constant value corresponding to an established setting.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are use to designate like parts:

Figure 2 is a schematic diagram illustrating an electric circuit as generally indicated in Figure 1 for measuring the welding current;

Figure 3 is a diagrammatic view illustrating, for a given voltage, the operation of the present welding system in function of time; and Figure 4 is a schematic diagram showing the manner in which the firing of the ignitrons can be initiated at various points in a half cycle for various control voltages.

Figure 1:
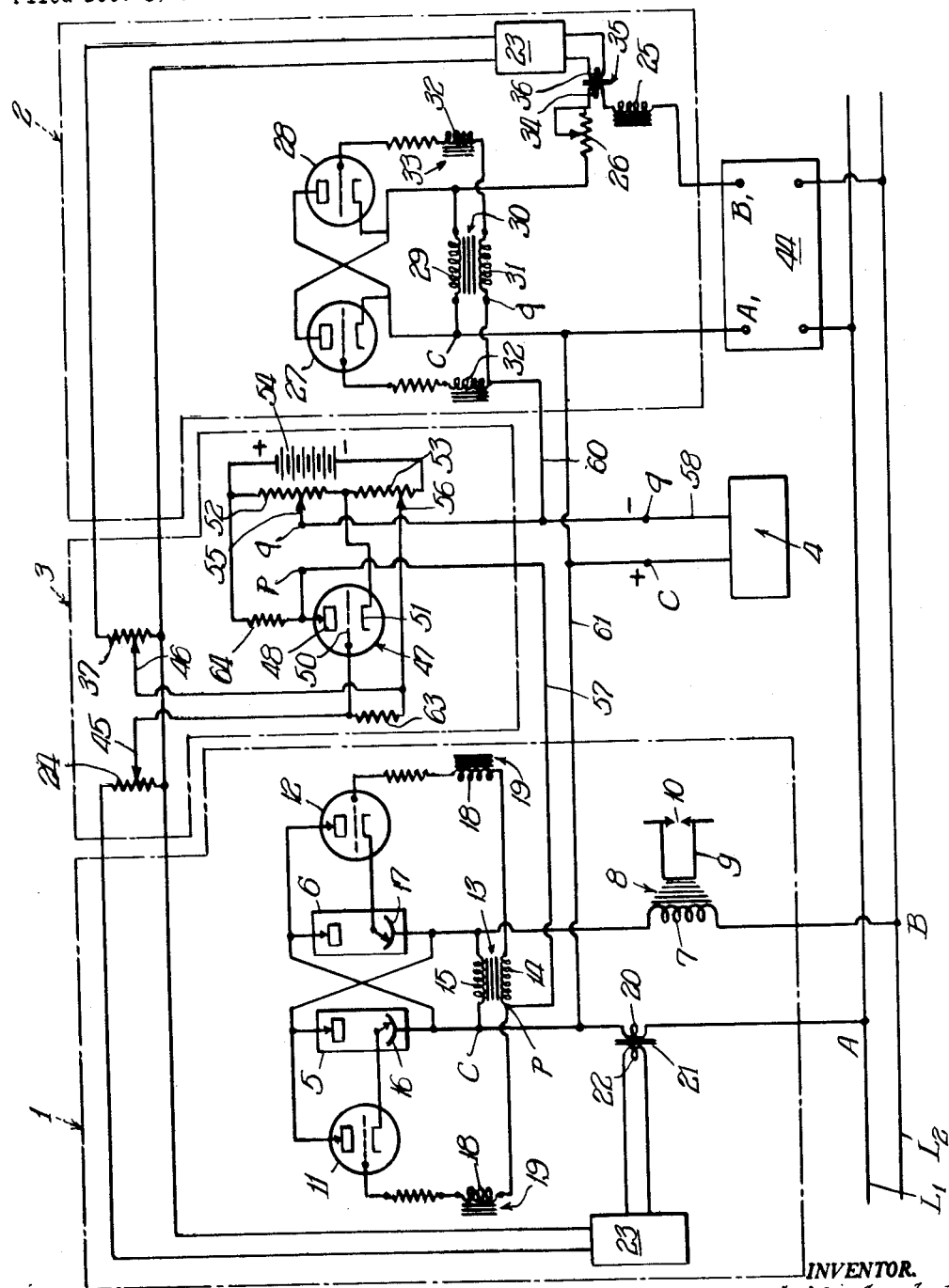
Figure 1 is a schematic diagram illustrating a welding system incorporating the improved phase shift control circuit of the invention.

In the welding system as shown in Figure 1 the intensity of the welding current is controlled by phase shifting the firing point of the ignitrons by applying a variable grid potential to the firing tubes of the same and which variable grid potential is obtained by superimposing two voltages, one an alternating current voltage and the other an adjustable direct current voltage. The phase relation between the alternating current voltage and the line voltage is constant. When the direct current voltage is varied the superimposed alternating current voltage renders the grid of the firing tubes positive at different points on the line voltage curve, these points being related to the value of the direct current voltage. An important feature of the present phase shift circuit resides in the fact that its operation is a function of the line voltage variations and of the welding circuit impedance variations. Both of these variations automatically add a second direct current voltage to the direct current voltage controlling the welding. This second direct current voltage is a function of the difference in one or the other direction between the real value of the welding current and the value that it should have for the particular setting. This added positive or negative voltage acts to always maintain the welding current at a value corresponding to the established setting whatever may be the variations in the line voltage or in the welding circuit impedance during a welding operation. The result is obtained by automatically decreasing the phase shift when the value of the welding current is below the established setting and by automatically increasing the phase shift when the value of the welding current exceeds said established setting.

The welding system shown in Figure 1 consists of the welding circuit generally identified by numeral 1, the reference circuit 2, the welding current regulating circuit 3, and the manual regulating device 4.

Referring to the welding circuit 1, it will be seen that the same includes ignitrons 5 and 6 electrically connected to each other in an inverse parallel manner for supplying the primary 7 of the welding transformer 8. The secondary or load circuit 9 of the welding transformer is electrically connected to the welding electrodes 10. Two thyratrons 11 and 12 are provided, one for each of the ignitrons, and the grid circuits of each of the firing thyratrons are connected together by the primary 14 of transformer 13. The secondary 15 of said transformer is connected at its ends to the respective cathodes 16 and 17 of the ignitrons 5 and 6, this arrangement being made to allow control of both thyratrons 11 and 12 by the same circuit. The grid bias of thyratrons 11 and 12 is provided by an adjustable direct current voltage applied to terminals $p$ and $c$ of the primary and secondary, respectively, of transformer 13, and by an alternating current voltage which is developed across the secondaries 18 of control transformers 19. The line voltage existing across points A and B of the alternating current source $L_1$—$L_2$ supplies current to the primary 7 of the welding transformer and which is controlled by ignitrons 5 and 6. Said primary circuit additionally includes the primary 20 of a transformer 21 for measuring the welding current. Secondary 22 of said transformer 21 is connected to the terminals of a measuring device 23 and is illustrated in detail in Figure 2. The measuring device 23 is such that the voltage at the terminals of the output potentiometer 24 of said device 23 represents the value of the welding currents.

The reference circuit 2 consists essentially of a circuit that includes a dummy load having the same power factor as the primary circuit 7. Said dummy circuit includes a reactor 25 and a variable resistor 26 connected in series with said reactor 25. Current for said dummy load is supplied by two thyratrons 27 and 28 connected in an inverse parallel manner similar in all respects to the connections of the ignitrons 5 and 6 of the welding circuit. The cathodes of the thyratrons 27 and 28 are connected together by the secondary winding 29 of a transformer 30. The primary 31 of this transformer 29 is connected to the grids of the thyratrons 27 and 28 through secondary windings 32 of control transformers 33. An alternating current voltage is developed across the secondary windings 32 and which is similar to and in phase with the alternating current voltage developed across secondary windings 18, it being understood that the control transformers 19 and 33 each include a primary winding having connection to the alternating current supply source indicated by leads $L_1$ and $L^2$.

The potential applied to the grids of thyratrons 27 and 28 is the result of two voltages, one an adjustable direct current voltage which is applied to the terminals $q$ and $c$ of the primary and secondary windings, respectively, of transformer 30, and the other an alternating current voltage which is developed across secondaries 32. Since the grid-cathode circuits of the thyratrons 27 and 28 are substantially identical to that of thyratrons 11 and 12, it will be understood that the same potential is applied to all the cathodes and which is the potential at point C.

The reference circuit 2 also includes the primary 34 of a measuring transformer 35, said primary winding being connected in series with the dummy load circuit 25. The secondary winding 36 of said transformer 35 is connected to a measuring device 23 similar to the measuring device previously referred to in connection with the welding supply circuit 1. The voltage at the terminals of the potentiometer 37, as measured by said device 23, is representative of the current in the dummy load circuit 25 of this reference circuit.

The measuring devices 23 of the reference circuit 2 and the welding circuit 1 are shown in Figure 2 as consisting of several conventional electric elements in combination. It will be understood that the current to be measured, and which flows in the primary 20 of transformer 21, or in the primary 34 of transformer 35, will produce a voltage which is a function of the current value at the terminals of the secondaries of each of these transformers. The device will be described in connection with transformer 21 and it will be understood that the terminals of the secondary winding 22 are connected to a rectifying device 38 connected so as to operate as a full wave rectifier. The current supplied by winding 22 is therefore rectified and the output consists of two positive half cycles for each cycle of alternating current supplied by said winding. The direct current from the rectifier 38 is supplied to a condenser 39, the circuit including a variable resistor 40, the same providing a time constant for controlling the charging rate of condenser 39. The said condenser 39 discharges across a resistor 41 which is likewise variable so that the same provides a time constant for controlling the rate of discharge. By means of the circuit above described a substantially sinusoidal voltage is supplied to a special peak voltmeter consisting of the rectifier 42 and condenser 43. The voltage at the terminals of the condenser 43 is applied across potentiometer 24.

One of said measuring devices produces a voltage at the terminals of potentiometer 24 which is proportional to the welding current and the other measuring device produces a voltage at the terminals of potentiometer 37 which is proportional to the current flowing through the dummy load circuit 25.

In order to prevent voltage variations in the alternating current supply source from affecting the dummy load circuit, current is supplied to said dummy load circuit through an automatic voltage regulator 44 of low rating and of the resonant circuit type, for example. Said regulator 44 is connected to the leads $L_1$ and $L_2$ of the alternating current supply and the terminals of the dummy load circuit are connected to said regulator at $A_1$—$B_1$.

The voltages from the measuring devices 23, which appear across potentiometers 24 and 37, respectively, are used to maintain the welding current supplied to the electrodes 10 substantially constant regardless of voltage variations in the alternating current supply source. For this purpose the movable contact 45 of potentiometer 24 and movable contact 46 of potentiometer 37 are connected to the grid of an electronic vacuum tube 47 constituting an element of the regulating circuit 3. The said tube 47 has a plate 48, a grid 50 and a cathode 51. The regulating circuit in addition to tube 47 consists of potentiometers 52 and 53 connected in series relation across the terminals of the direct current source 54 constituting a battery or the like having plus and minus terminals connected as shown. The plate 48 is connected to the plus side of said battery, the negative side of said battery being connected through potentiometer 53 to the grid 50 of said electronic tube 47. The cathode 51 of said tube is electrically connected to the potentiometers at a point between the same. The potentiometer 52 has a movable contact 55 and in a similar manner potentiometer 53 has a movable contact 56 which is included in the grid circuit of the tube 47 so that adjustment of the same will vary the potential applied to the grid of said tube. The conductor 57 connects the plate circuit of said tube 47 with the primary winding 14 and accordingly point $p$ in the welding circuit has the same potential as point $p$ in the regulating circuit. The potential applied to plate 48 is accordingly applied to the grids of the thyratrons 11 and 12. Movable contact 55 is connected by conductor 58 to the negative side of a source of adjustable direct current voltage heretofore identified in general by numeral 4. A conductor 60 joins conductor 58 to the grid circuit of the thyratrons 27 and 28 and accordingly point $q$ in reference circuit 2 has the same potential as point $q$ in the regulating circuit 3.

The positive side of the adjustable direct current voltage 4 is connected by conductor 61 to the cathodes of the thyratrons 11 and 12 and also to the cathodes of the thyratrons 27 and 28. The adjustable direct current voltage supplied by 4 controls the intensity of the welding current and it is understood that said direct current voltage may be produced by a relaxation oscillator for the welding of successive spots as in seam welding, or by any other device controlled by a synchronization apparatus and producing a variable voltage.

The operation of the system as herein described is as follows: When the welding machine is at rest the two movable contacts 45 and 46 are at the same potential inasmuch as currents in both the welding circuit 1 and reference circuit 2 are zero. However, a certain current is flowing through the electronic tube 47 since it is operatively connected to the terminals of the direct current source 54 and since the contact 56 has been adjusted to predetermine the value of said current. The movable contact 55 on potentiometer 52 is adjusted to be at the same potential as that of plate 48, or, in other words, points $p$ and $q$ are adjusted to the same potential. The firing of the thyratrons 11 and 12 and the firing of thyratrons 27 and 28 is initiated by the alternating current voltages appearing across the secondaries 18 and 32. In this respect the transformers 19 and 33 function as peaking transformers, it being understood that they each include a primary winding connected directly to the alternating current source $L_1$ and $L_2$, and said peaking voltages are accordingly in phase with the line voltage. The phase shifting of the firing point of the ignitrons 5 and 6 is controlled as follows:

The biasing potential applied to the grid of thyratons 11 and 12 is the algebraic sum of the direct current voltage applied to points $c$ and $p$ and the alternating current voltage developed across the secondaries 18 as described, the cathodes being maintained at a potential which is that of point $c$. When the proper adjustment of the apparatus has been made the potential at point $p$ will be the same as the potential at point $q$, or, in other words, the difference in potential between points $p$ and $c$ is the same as the voltage applied by the regulating device 4. When the voltage between points $p$ and $c$ equals $V_1$, Figure 3, the bias potential applied to each of the thyratrons 11 and 12 is equal to said voltage $V_1$ plus the alternating current voltage developed across secondaries 18. It will be understood by reference to Figure 3 that under these conditions the potential applied to the grids of thyratrons 11 and 12 is never positive with respect to the cathode. Accordingly, thyratrons 11 and 12 are held in a non-conductive state and current is prevented from flowing through the welding circuit.

When the voltage between points $p$ and $c$ is reduced by the regulating device 4 to a value $V_2$ so that the potential on the grids is less negative with respect to that of the cathodes, then it will be seen that when the alternating current voltage developed across secondaries 18 is superimposed on voltage $V_2$ that the potential on the grids will become positive at certain points on the alternating voltage curve. The firing of the thyratrons 11 and 12 is accordingly initiated at time $T_2$ and the ignitrons 5 and 6 are thereupon rendered conductive to pass current with said current flow continuing for the remainder of the half cycles. Flow of current is indicated on Figure 3 by the shaded area 62 for each half cycle of the power supply current. By adjusting voltage $V_2$ to different values it will be seen that the superimposed alternating current voltage developed across the terminals of the secondaries 18 will intersect the voltage curve at variable points in the respective half cycles so that control of the current supplied to the welding electrodes is obtained. Thus, in Figure 4 a voltage $V_3$ results in the firing of the thyratrons at a point in the voltage curve corresponding to time $T_3$. Another voltage $V_4$ further delays the firing of the ignitrons to a point in the positive half cycle indicated by $T_4$ and still further delayed firing is obtained by voltage $V_5$ whereby the ignitrons are fired at time $T_5$. The points $T_3$, $T_4$ and $T_5$ correspond to an increased phase shifting of the firing point of the thyratrons.

For a proper start in the operation of the present welding system it is required that the movable contacts be adjusted so that the voltage between points $p$ and $q$ is zero. To initiate a welding operation the voltage applied to points $c$ and $q$ by the welding control device 4 must be such that the superimposed alternating current voltage will result in a positive potential being applied at certain times to the grids of the thyratrons. The thyratrons 27 and 28 are caused to fire simultaneously and in the same manner as described in connection with thyratrons 11 and 12, and in the dummy load circuit 25 a current of a certain value is thereby caused to flow which produces a representative voltage across the terminals of potentiometer 37. This voltage is not affected by voltage variations in the alternating current supply source inasmuch as the current flowing through the dummy load circuit will have a constant and stabilized voltage by reason of the voltage regulator 44. However, the current flowing through primary winding 7 of the welding circuit will have a variable voltage because of voltage variations in the alternating current supply source or as a result of variations in the welding circuit impedance.

Assuming, for example, that the current flowing through primary winding 7 as a result of ignitrons 5 and 6 being rendered conductive has a reduced voltage, then under these conditions the potential at point *p* becomes higher than the potential at point *q* by reason of the following operation: The reduced voltage of the primary current flowing through the welding circuit, will reduce the voltage across the terminals of potentiometer 24 to a proportional extent. The original adjustment of the contacts 45 and 46 was such that the voltages from the respective potentiometers 24 and 37 cancelled each other since they are applied to the respective ends of a resistance element 63 in the grid circuit of the vacuum tube 47. When the voltage across the terminals of 24 is reduced current flows through the element 63 and the voltage drop renders the grid 50 more negative than before.

As a result a corresponding reduction takes place in the flow of plate current. The potential at point *p*, due to a reduced voltage drop across the resistance element 64, becomes higher than the value originally set, or, in other words, the potential at point *p* is now higher than at point *q*.

The operation of the electronic tube 47 is such as to automatically adjust the biasing potential applied to the grids of the thyratrons 11 and 12 controlling the welding circuit. The biasing potential is rendered less negative with respect to the cathodes of the thyratrons and this results in firing the thyratrons at an earlier point in the positive half cycles so that the current supplied to the welding electrodes is increased. This current increase compensates for the reduced voltage of the alternating current supply source and the value of the current supplied to the welding electrodes is thus maintained substantially constant. In other words, the action of the vacuum tube is such as to produce an automatic correction by modifying the potential at point *p* in relation to the potential at point *q*. Whereas, the potential at point *p* was increased with respect to *q*, as a result of a drop in line voltage, it will be understood that the apparatus will respond in a similar manner to lower the potential at point *p* with respect to *q* as a result of an increase in line voltage.

To summarize, it may be stated that in order to make the welding system independent of line voltage variations and independent of welding circuit impedance variations, a voltage is developed across points *p* and *q* which is a function of the line voltage or of welding circuit impedance variations, and which is algebraically added to the control voltage provided by the regulating device 4. As a result the welding current is not affected by the two variations above mentioned and its value is determined only by the control voltage provided by said regulating device.

What is claimed is:

1. In a control circuit for a welding system including a welding transformer having a primary winding, electric discharge valves for passing current through said primary winding, and firing valves controlling the conductivity of said discharge valves, the combination therewith of grid biasing means for said firing valves including welding current control means for supplying an adjustable direct current voltage, control transformers for superimposing an alternating current voltage on said direct current voltage, and other means for additionally superimposing a second direct current voltage which is a function of voltage variations in the primary circuit and of impedance variations in the welding system.

2. In a control circuit for a welding system including a welding transformer having a primary winding connected to an alternating current source, electric discharge valves for passing current through said primary winding, and firing valves controlling the conductivity of said discharge valves, the combination therewith of grid biasing means for said firing valves including welding current control means for supplying an adjustable direct current voltage, control transformers for superimposing an alternating current voltage on said direct current voltage, and other means for automatically superimposing a second direct current voltage which is variable and a function of voltage variations in the alternating current source and of impedance variations in the welding system.

3. In a control circuit for a welding system including a welding transformer having a primary winding connected to an alternating current source, electric discharge valves for passing current through said primary winding, and firing valves controlling the conductivity of said discharge valves, the combination therewith of grid biasing means for said firing valves including welding current control means for supplying an adjustable direct current voltage, control transformers for superimposing an alternating current voltage on said direct current voltage, and other means for automatically superimposing a variable direct current voltage which has the effect of shifting the phase of the grid biasing potential with respect to the line voltage, said variable direct current voltage being a function of the voltage variations of the alternating current source and of the impedance variations in the welding system.

4. A control circuit for a welding system which includes a welding transformer primary, electric discharge valves for passing current through said primary, and firing valves of the grid-controlled type for controlling the conductivity of said discharge valves, comprising in combination with control voltage means for triggering said firing valves to initiate a welding operation and for maintaining said firing valves non-conductive between welding operations, of a regulating circuit operating to automatically supply a grid potential of variable direct current voltage and which is algebraically added to said control voltage whereby to shift the firing point of said valves so as to maintain the welding current substantially constant irrespective of line voltage variations.

5. A control circuit for a welding system which includes a welding transformer primary, electric discharge valves for passing current through said primary and firing valves of the grid controlled type for controlling the conductivity of said discharge valves, comprising in combination, welding current control means for supplying an adjustable direct current voltage as a biasing potential for said firing valves, a regulating circuit supplying a variable direct current voltage which may be plus or minus with respect to the biasing potential and which is algebraically added to the same, and peaking means for superimposing an alternating current voltage on the sum of said direct current voltages to trigger the firing valves, said variable direct current voltage being a function of the variations in the voltage of the primary current.

6. A control circuit for a welding system which includes the primary winding of a welding transformer connected to a source of alternating current, electric discharge valves for controlling flow of current through said primary winding, and firing valves of the grid-controlled type for controlling the conductivity of the electric discharge valves, of a reference circuit connected to the alternating current source through a constant voltage regulator and including a reactor providing a dummy load having the same power factor and current setting as that established for the welding system, a voltage measuring circuit for said welding system providing a voltage proportional to current flow through the primary winding, a second voltage measuring circuit for said reference circuit providing a voltage proportional to current flow in the reactor, control voltage means for triggering said firing valves to initiate a welding operation and for maintaining said firing valves non-conductive between welding operations, and a regulating circuit operating to supply a grid potential of variable direct current voltage and which is algebraically added to said control voltage whereby to shift the firing point of said valves, said grid potential of variable direct current voltage being a function of the difference in the voltages provided by said two measuring circuits, whereby said shift in the firing point of the valves compensates for variations in the voltage of the alternating current supply source.

7. In a control system, the combination with a welding circuit wherein the primary winding of a welding transformer is connected to a source of alternating current and wherein electric discharge valves rendered conductive by firing valves control flow of current through said primary winding, of means maintaining current flow through the primary winding substantially constant for any particular adjustment irrespective of voltage variations in the alternating current source, said means including a reference circuit connected to the alternating current source through a constant voltage regulator and including a reactor providing a dummy load having the same power factor and current setting as that established for the welding circuit, a voltage measuring circuit for said welding circuit providing a voltage proportional to current flow through the primary winding, a second voltage measuring circuit for said reference circuit providing a voltage proportional to current flow in the reactor, control voltage means supplying a grid biasing voltage for triggering said firing valves to initiate a welding operation and for maintaining said valves non-conductive between welding operations, and a regulating circuit for supplying a grid potential of variable direct current voltage and which is superimposed on the voltage supplied by said control voltage means whereby to shift the firing point of said valves, said regulating circuit having operation in accordance with the difference in the voltages provided by said two measuring circuits, whereby said operation is a function of the voltage variations in the alternating current source and of the impedance variations in the welding circuit so that the shifting of the firing point of the valves compensates for said variations to maintain current flow in the primary winding substantially constant.

8. In a control system, the combination with a welding circuit wherein the primary winding of a welding transformer is connected to a source of alternating current and wherein electric discharge valves rendered conductive by firing valves control flow of current through said primary winding, of means maintaining current flow through the primary winding substantially constant for any particular adjustment irrespective of voltage variations in the alternating current source, said means including a reference circuit connected to the alternating current source through a constant voltage regulator and including a reactor providing a dummy load having the same power factor and current setting as that established for the welding circuit, a voltage measuring circuit for said welding circuit providing a voltage proportional to current flow through the primary winding, a second voltage measuring circuit for said reference circuit providing a voltage proportional to current flow in the reactor, control voltage means supplying a grid biasing voltage for triggering and firing valves to initiate a welding operation and for maintaining said valves non-conductive between welding operations, and a regulating circuit including a grid controlled vacuum valve for supplying a grid potential of variable direct current voltage and which is algebraically added to the voltage supplied by said control voltage means whereby to shift the firing point of said valves, the grid bias for said vacuum valve comprising the difference in the voltages provided by said two measuring circuits, whereby said grid potential of variable direct current voltage is a function of the voltage variations in the alternating current source and the impedance variations in the welding circuit so that the shift in the firing point of said valves thus automatically compensates for said variations to maintain the current flow through the primary winding substantially constant.

MARCEL MICHELET.

No references cited.